United States Patent [19]

Goode

[11] 4,370,080

[45] Jan. 25, 1983

[54] TOOL HEAD HAVING NUTATING SPINDLE

[75] Inventor: Keith F. Goode, Rockford, Ill.

[73] Assignee: The Ingersoll Milling Machine Company, Rockford, Ill.

[21] Appl. No.: 192,687

[22] Filed: Oct. 1, 1980

[51] Int. Cl.³ .............................................. B23C 1/12
[52] U.S. Cl. .................................. 409/200; 409/201; 409/211; 409/216
[58] Field of Search ............... 409/211, 197, 204, 191, 409/199, 200, 201, 216; 408/237

[56] References Cited

U.S. PATENT DOCUMENTS

| | | | |
|---|---|---|---|
| 2,310,870 | 2/1943 | Retterath | 408/237 |
| 2,728,268 | 12/1955 | Clifton et al. | 409/197 X |
| 3,232,141 | 2/1966 | Swanson et al. | 408/237 X |
| 3,359,861 | 12/1967 | Johnson et al. | 409/211 |
| 3,690,220 | 9/1972 | Escobedo | 409/211 |
| 3,823,644 | 7/1974 | Mello | 409/204 |
| 4,104,943 | 8/1978 | Calderoni | 409/191 |
| 4,245,939 | 1/1981 | Sear | 409/191 |

FOREIGN PATENT DOCUMENTS

| | | | |
|---|---|---|---|
| 2428492 | 2/1980 | France | 409/201 |
| 622590 | 9/1978 | U.S.S.R. | 409/216 |
| 673387 | 7/1979 | U.S.S.R. | 409/201 |

OTHER PUBLICATIONS

Popular Science article.
Tooling & Production article.

*Primary Examiner*—William R. Briggs
*Attorney, Agent, or Firm*—Leydig, Voit, Osann, Mayer & Holt, Ltd.

[57] ABSTRACT

A machine tool head in which a rotary spindle is adapted to nutate by virtue of the spindle being mounted in a housing supported to rotate about a predetermined axis and by virtue of the housing being mounted in another housing adapted to rotate about an axis which is inclined relative to the first axis. A train of bevel gears connects the spindle to a non-nutating drive motor and maintains a rotary drive from the motor to the spindle in all positions of the spindle.

8 Claims, 5 Drawing Figures

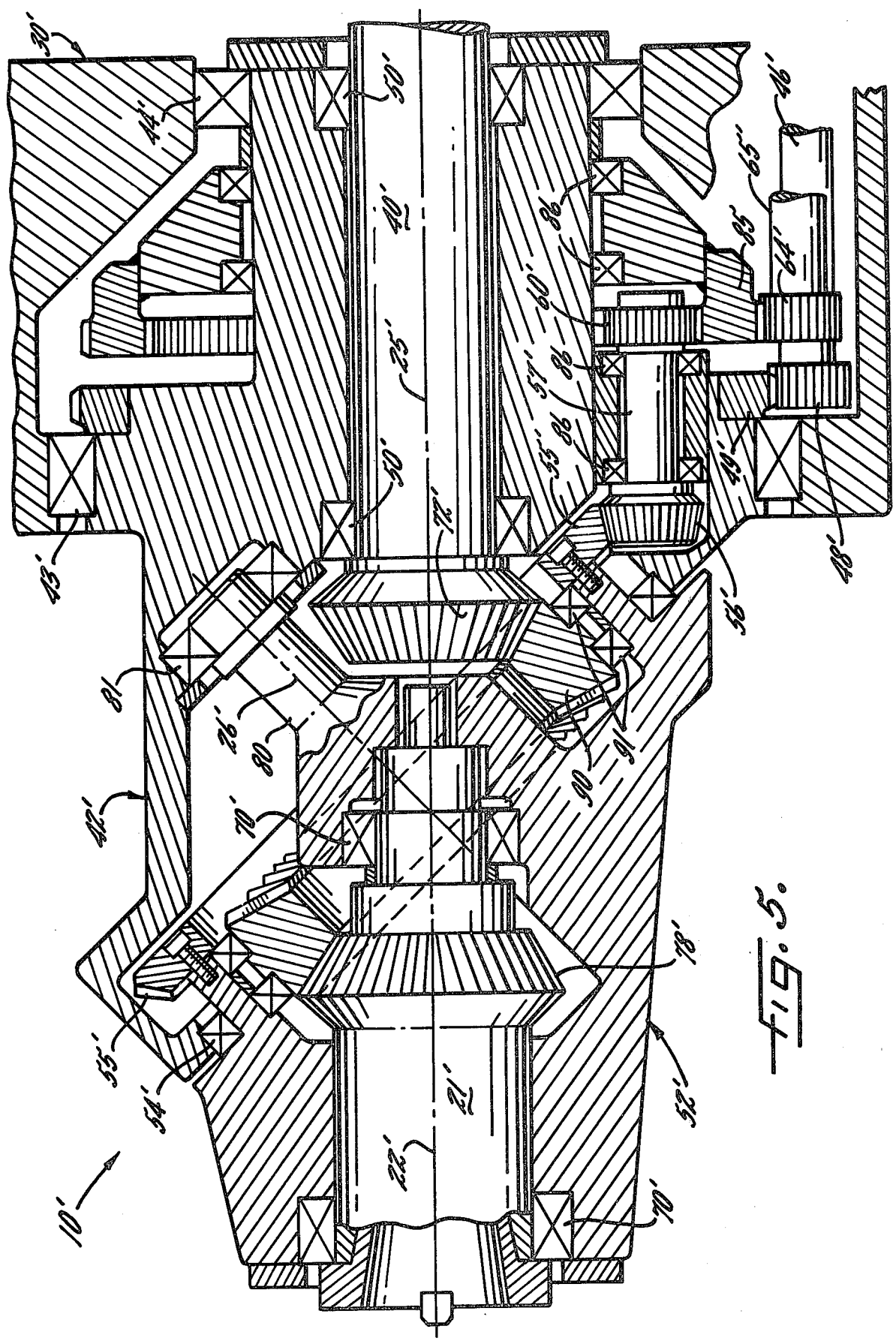

TOOL HEAD HAVING NUTATING SPINDLE

BACKGROUND OF THE INVENTION

This invention relates to a machine tool head for supporting a spindle for rotation about its own axis. The spindle is adapted to be rotated by a motor and usually carries a cutting tool such as a milling cutter for removing material from a workpiece.

The invention more specifically relates to a head which is adapted to support the spindle for swiveling or nutation about the point of intersection of two mutually inclined axes so as to enable the spindle and the cutting tool to be tilted to various positions and to be moved in various paths. In this way, the cutting tool can be positioned and moved to work at different angles and/or to form relatively complex shapes on the workpiece.

A machine tool with a nutating head is disclosed in Mello U.S. Pat. No. 3,823,644. In the Mello head, a first rotary slide is supported to rotate about a first axis and supports a second rotary slide adapted to rotate about a second axis which is inclined relative to the first axis. By selectively rotating the two slides about their respective axes, the spindle can be tilted to different positions and moved in different paths.

SUMMARY OF THE INVENTION

The general aim of the present invention is to provide a new and improved machine tool head which effects nutation of the spindle and the cutting tool about the point of intersection of two mutually inclined axes but which enables the spindle and the tool to be rotated by a non-nutating drive motor so that the motor need not be carried by and moved with the nutating portion of the head.

A more detailed object is to achieve the foregoing by providing a head in which the spindle is coupled to the drive motor in a unique manner enabling the spindle to nutate relative to the motor while maintaining a rotative drive from the motor to the spindle at all times.

The invention also resides in the novel construction of the rotary slides of the head and in the provision of unique gearing which coacts with the slides to permit the spindle to nutate while rotatively coupling the spindle to the non-nutating drive motor.

These and other objects and advantages of the invention will become more apparent from the following detailed description when taken in conjunction with the accompanying drawings.

BRIEF DESCRIPTION OF THE DRAWINGS

FIG. 5 is a cross-sectional view of a modified head incorporating the features of the invention.

DETAILED DESCRIPTION OF THE PREFERRED EMBODIMENTS

Figure 1:
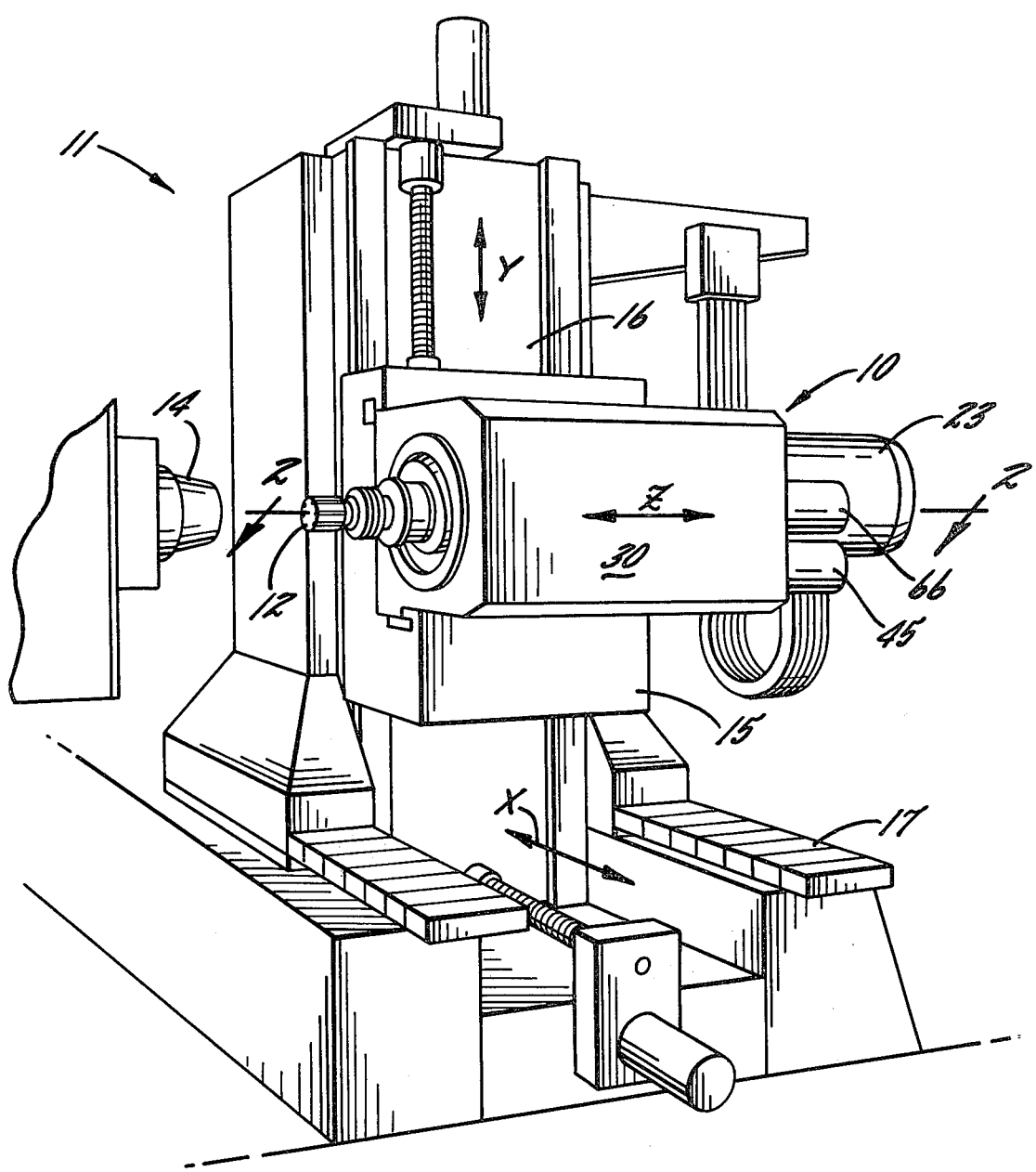
FIG. 1 is a fragmentary perspective view of a typical machine tool equipped with a new and improved head incorporating the unique features of the present invention.

For purposes of illustration, the machine tool head 10 of the present invention is shown in the drawings in conjunction with a five-axis milling machine 11. The head rotatably supports a cutting tool such as a milling cutter 12 which is adapted to remove metal from a workpiece 14.

The head 10 is supported in a conventional manner on a carriage 15 to move horizontally along one axis (commonly called the Z-axis) toward and away from the workpiece 14. The carriage, in turn, is mounted on a column 16 to move upwardly and downwardly along a Y-axis extending perpendicular to the Z-axis. At its lower end, the column is supported on a bed 17 and is adapted to move horizontally back and forth along an X-axis which is perpendicular to both the Y and Z axes. The head, the carriage and the column are moved along their respective axes by motors which are controlled by a computerized numerical control (CNC) unit (not shown). The rectilinear position of the cutting tool 12 thus can be adjusted and precisely controlled.

A tapered mounting shank 18 (FIG. 2) extends from the cutting tool 12 and is clamped within a collet 20. The latter is secured rigidly within a tubular spindle 21 which is adapted to be rotated about its own axis 22 by a motor 23 having a rotary drive shaft 24.

In accordance with the present invention, the head 10 is uniquely constructed to permit the cutting tool 12 and the spindle 21 to nutate about the point of intersection of two mutually inclined axes 25 and 26 and to nutate relative to the drive motor 23 while maintaining a rotating drive between the spindle and the drive motor at all times. With this arrangement, the spindle 21 can be tilted to various positions and can be moved in various paths but it is not necessary to tilt and move the drive motor of the spindle as the spindle nutates.

Figure 2:
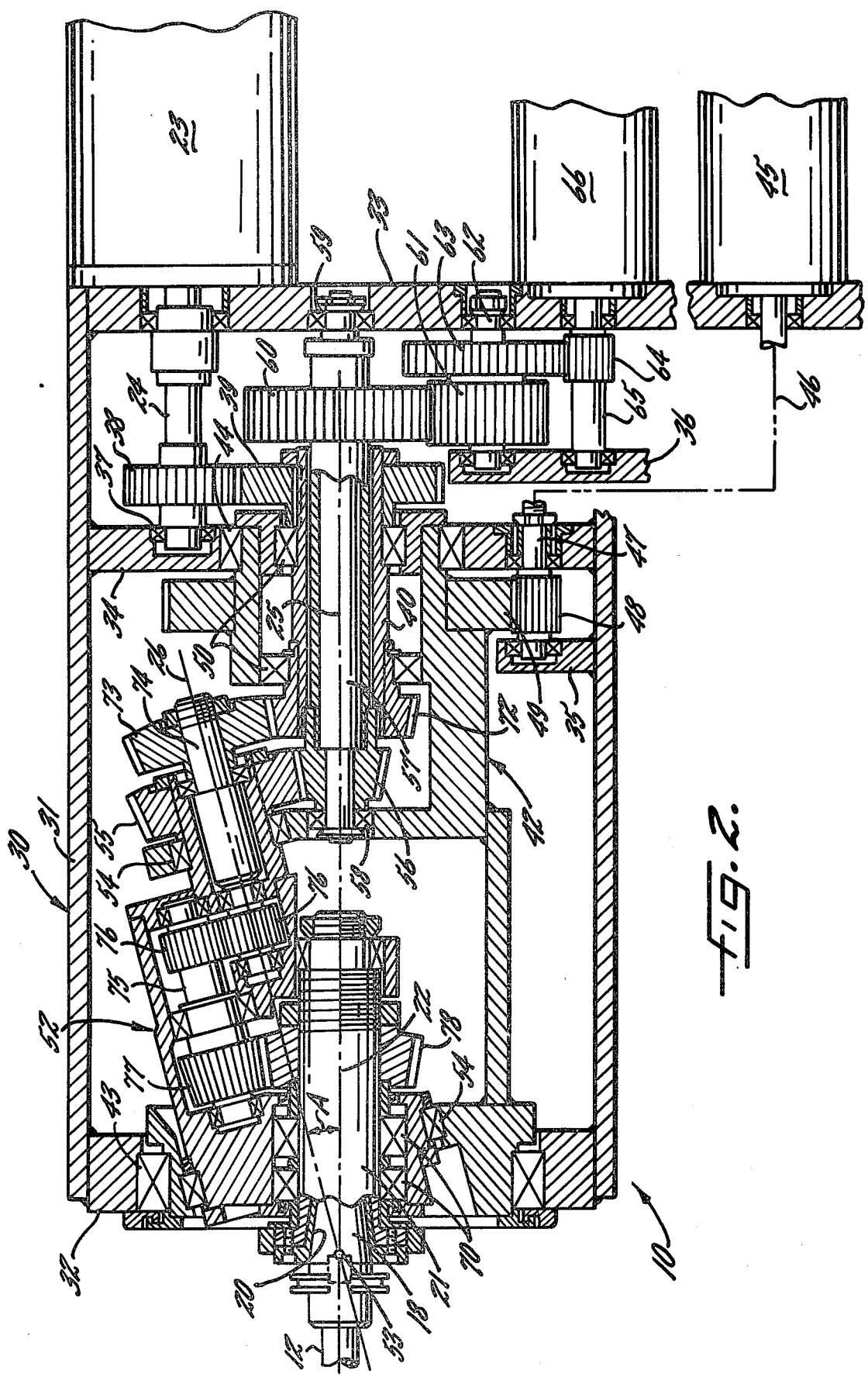
FIG. 2 is an enlarged fragmentary cross-section taken substantially along the line 2—2 of FIG. 1.

More specifically, the head 10 includes a main support or housing 30 which is mounted on the carriage 15 to move back and forth along the Z-axis, the housing being rotationally stationary. The housing is formed by a generally cylindrical sleeve 31 (FIG. 2) which is closed by front and rear end walls 32 and 33. An intermediate wall 34 spans the interior of the sleeve 31 while mounting webs 35 and 36 project inwardly from the sleeve. In FIG. 2, the housing 30 has been shown somewhat schematically and part of the sleeve 31 has been broken away for purposes of clarity.

The spindle drive motor 23 is mounted on the rear wall 33 of the housing 30 and its drive shaft 24 is journaled by a bearing 37 (FIG. 2) which is supported by the intermediate wall 34. A gear 38 on the shaft 24 meshes with a gear 39 on a tubular drive shaft 40 whose axis coincides with the axis of the sleeve 31 of the housing 30. Herein, the axis of the drive shaft 40 devines the axis 25 about which the spindle 21 is adapted to nutate.

In keeping with the invention, a rotary slide or second housing 42 is mounted in the housing 30 to rotate about the axis 25. As shown in FIG. 2, the housing 42 is mounted for such rotation by bearings 43, 44 which are supported by the front end wall 32 and the intermediate wall 34, respectively, of the housing 30. The housing 42 is generally in the form of a sleeve-like member and is adapted to be rotated about the axis 25 upon energization of a motor 45 which is controlled by the CNC unit. The motor 45 is mounted on the rear wall 33 of the housing 30 and its drive shaft 46 (shown schematically in FIG. 2) is connected to a shaft 47 which is rotatably supported by the intermediate wall 34 and the web 35 of the housing 30. A gear 48 is mounted on the shaft 47 and meshes with a gear 49 on the housing 42 to turn the housing about the axis 25 when the motor 45 is energized.

Two bearings 50 (FIG. 2) are mounted within the housing 42 and rotatably support the drive shaft 40. Thus, the housing 42 is capable of rotating within the housing 30 and relative to the drive shaft 40.

A second rotary slide in the form of a housing 52 is mounted within the housing 42 to rotate relative to the latter about an axis which defines the nutating axis 26 of the spindle 21. The axis 26 is inclined relative to the axis 25 and intersects the axis 25 at 53 (FIG. 2) which defines the point of nutation or the swivel point of the spindle 21. In this instance, the angle A of inclination between the axes 25 and 26 is approximately 15 degrees.

The housing 52 is mounted to turn within the housing 42 and about the axis 26 by a pair of bearings 54 (FIG. 2) which are supported by the housing 42. To turn the housing 52 about the axis 26, a bevel gear 55 is fastened to the housing 52 and meshes with another bevel gear 56 on the front end portion of a shaft 57. The latter extends rotatably through the drive shaft 40 and is journaled at its front and rear ends by bearings 58 and 59 (FIG. 2) which are supported by the housings 42 and 30, respectively. A gear 60 on the rear end portion of the shaft 57 meshes with a gear 61 on a shaft 62 supported by the rear wall 33 and the web 36 of the housing 30. Another gear 63 is fast on the shaft 62 and meshes with a gear 64 on the drive shaft 65 of a motor 66. The latter is supported on the rear end wall 33 of the housing 30 and is controlled by the CNC unit. When the motor 66 is energized, its drive shaft 65 acts through the shaft 62 and 57 and the bevel gears 56 and 55 to turn the housing 52 within the housing 42 and about the inclined axis 26.

Figure 3:
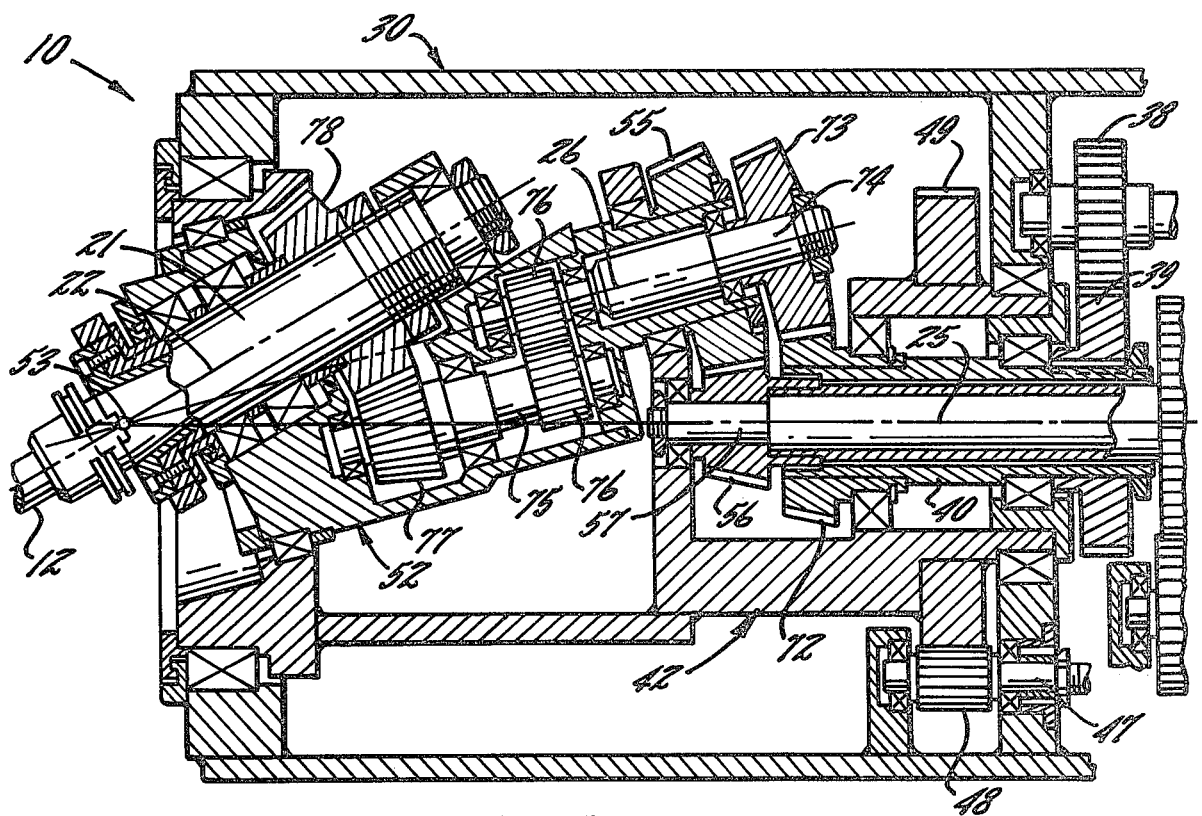
FIGS. 3 and 4 are views similar to FIG. 2 but show the spindle in different positions.
Figure 4:
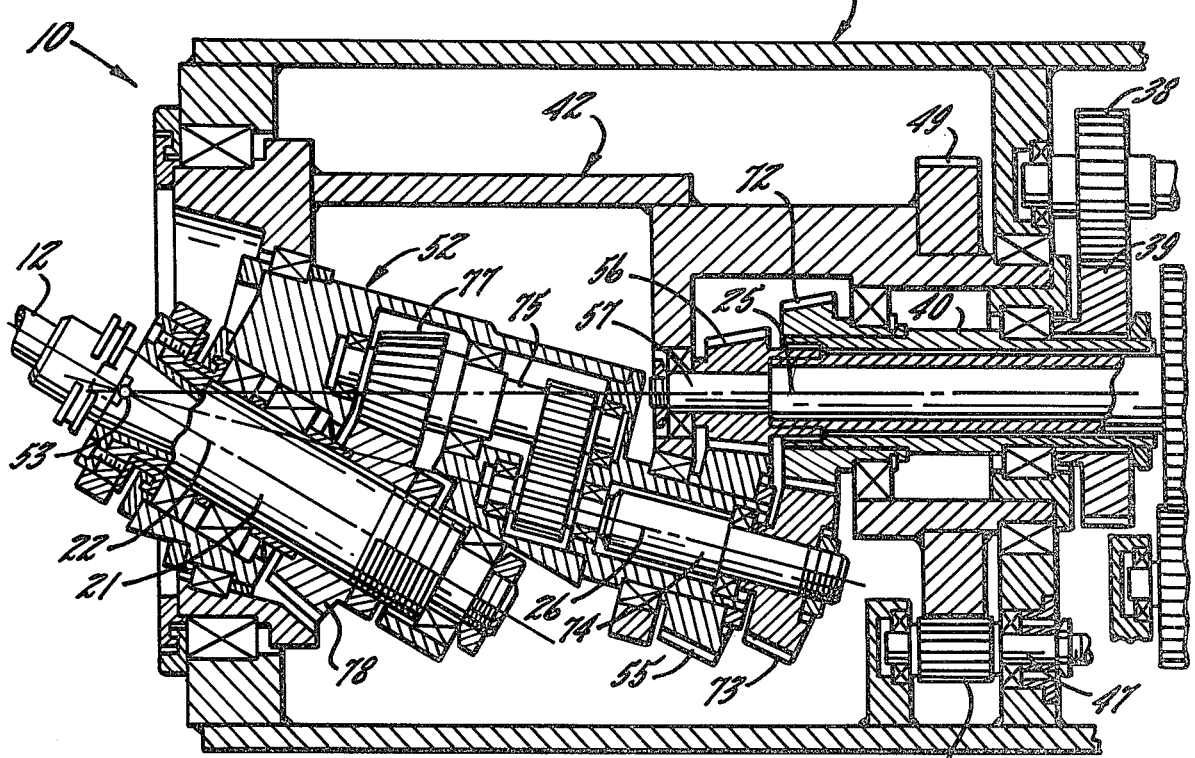

As shown in FIG. 2, the spindle 21 is mounted to rotate within three bearings 70 which are supported by the housing 52. The axis 22 of the spindle 21 is inclined relative to the rotational axis 26 of the housing 52 by an angle which is equal to the angle A. If the housing 42 is held stationary in the position shown in FIG. 2 and if the housing 52 is rotated by the motor 66, the spindle 21 and the tool 12 are tilted and are moved in a path which is eccentric with respect to the axis 25. If the housing 52 is rotated 180 degrees from the position shown in FIG. 2, the spindle 21 is turned and tilted from a horizontal position (FIG. 2) to a tilted position (FIG. 3) in which the forward end portion of the spindle is inclined downwardly at an angle of 30 degrees. If the housing 42 then is rotated 180 degrees about the axis 25 by the drive motor 45, the spindle 21 is turned to a position in which its forward end portion tilts upwardly an an angle of 30 degrees as shown in FIG. 4. By rotating both housings 42 and 52 simultaneously under the control of the CNC unit, the spindle 21 can be made to assume various tilted positions between the extreme positions shown in FIGS. 3 and 4 and can be made to move in different paths which are eccentric to the axis 25. The bevel gears 55 and 56 are angled so as to remain in meshing engagement with one another when the housing 42 is rotated about the axis 25, the gear 55 walking around the gear 56 during such rotation.

In carrying out the invention, means are provided for establishing a rotative drive between the nutating spindle 21 and the non-nutating drive shaft 40 and for maintaining that drive in all positions of the spindle. Herein, these means comprise a beveled pinion gear 72 (FIG. 2) coupled securely to the spindle drive shaft 40 and positioned in meshing engagement with another beveled pinion gear 73. The latter is fast on the rear end of a shaft 74 which is journaled in the housing 52 to turn about an axis coinciding with the rotational axis 26 of the housing 52. Another shaft 75 extending parallel to the shaft 74 is also journaled in the housing 52 and is coupled to the shaft 74 by straight pinions 76 (FIG. 2) on the forward end of the shaft 74 and on the rear end of the shaft 75. A beveled pinion gear 77 on the forward end of the shaft 75 meshes with still another beveled pinion gear 78 on the rear end portion of the spindle 21. Accordingly, the drive motor 23 is connected to rotate the cutting tool 12 and the spindle 21 by way of the tubular drive shaft 40, the bevel gears 72 and 73, the shafts 74 and 75 and the bevel gears 77 and 78.

By virtue of the angles of the bevel gears 72, 73, 77 and 78 and of the shafts 74 and 75, the rotative drive from the drive shaft 40 to the spindle 21 is maintained in all positions of the spindle. When either of the housings 42 or 52 is turned about their respective axes 25 or 26, the bevel gears 73 and 77 walk around the bevel gears 72 and 78, respectively, while remaining in meshing engagement with the latter gears. As a result, a rotative drive is maintained at all times between the non-nutating drive motor 23 and the nutating spindle 22. Thus, the nutating portions of the head 30 need not carry the weight of the drive motor 23 and, in addition, the electrical connections to the motor need not accommodate nutation of the motor.

Another embodiment of a machine tool head 10' incorporating the principles of the invention is shown in FIG. 5 in which parts corresponding to those of the first embodiment are indicated by the same but primed reference numerals. The head 10' functions the same as the head 10 but its construction is somewhat different.

The head 10' includes a rotationally stationary main housing 30'. Supported within the housing 30' by bearings 43' and 44' is a first rotary slide or housing 42' which is adapted to turn about an axis 25'. A second rotary slide or housing 52' is supported by a bearing 54' within the housing 42' and is adapted to turn about an axis 26' which is inclined relative to the axis 25'. Formed on the rear end portion of the housing 52' is a stub shaft 80 which is journaled in the housing 42' by a bearing 81, the axis of the stub shaft coinciding with the axis 26'.

A drive shaft 40' is journaled by bearings 50' in the housing 42' and, when a spindle drive motor (not shown) is energized, the shaft 40' is rotated about an axis which coincides with the axis 25'. The housing 52' supports bearings 70' which rotatably journal a spindle 21'.

To turn the housing 42' about the axis 25', a power-driven shaft 46' is rotatably supported by the housing 30' and carries a pinion 48' which meshes with a gear 49' fastened to the housing 42'. The housing 52' is adapted to be rotated about the axis 26' by a second power-driven shaft 65' rotatably supported by the housing 30' and carrying a pinion 64' which meshes with the outer side of a ring gear 85, the latter being journaled on the housing 42' by bearings 86. A pinion 60' meshes with the inner side of the ring gear 85 and is mounted on one end of a shaft 57' which is rotatably mounted in the housing 42' by bearings 86. Fastened to the other end of the shaft 57' is a beveled pinion gear 56' which meshes with a beveled ring gear 55' secured rigidly to the housing 52' and coaxial with the stub shaft 80. The drive shaft 65' thus acts through the shaft 57' and the bevel gears 56' and 55' to turn the housing 52' about the axis 26'.

The spindle 21' is rotated about its axis 22' by a beveled pinion gear 72' which is fastened to the forward end of the drive shaft 40'. The gear 72' meshes with one side of a double-sided beveled ring 90 which is journaled by bearings 91 in the housing 52' to turn about the axis 26'. Meshing with the other side of the ring gear 90 is another bevel gear 78' which is secured to the rear end portion of the spindle 21'. Thus, a rotative drive from the shaft 40' to the spindle 21' is established by way of the bevel gear 72', the double-sided beveled ring gear 90 and the bevel gear 78'.

I claim:

1. A machine tool head comprising a support, a power-driven shaft mounted on said support to rotate about its own axis, a first rotary slide mounted on said support to rotate relative to said support and said shaft about a first axis coinciding with the axis of said shaft, a second rotary slide supported by said first slide to rotate with said first slide about said first axis and to rotate relative to said first slide about a second axis which is inclined relative to said first axis at a predetermined acute angle substantially less than a right angle, a spindle supported by said second slide to rotate with said second slide about said second axis and to rotate relative to said second slide about a third axis which is inclined relative to said second axis at an acute angle equal to said predetermined angle, said first, second and third axes all intersecting one another at a common point, means selectively operable to turn said first slide about said first axis, means selectively operable to turn said second slide about said second axis, and means coupling said shaft to said spindle and operable to maintain a rotative drive from said shaft to said spindle to turn said spindle about said third axis both when said first slide is turned about said first axis and when said second slide is turned about said second axis.

2. A machine tool head as defined in claim 1 in which said coupling means comprise a first bevel gear secured to and coaxial with said shaft, a second bevel gear secured to and coaxial with said spindle, and third bevel gear means for rotatively coupling said first and second bevel gears.

3. A machine tool head as defined in claim 2 in which said third bevel gear means comprise a pair of bevel gears with at least one gear of said pair being rotatable about said second axis, one of said pair of bevel gears meshing with said first bevel gear, and the other of said pair of bevel gears meshing with said second bevel gear.

4. A machine tool head as defined in claim 2 in which said firt and second bevel gears are pinion gears, said third bevel gear means comprising a ring gear having teeth on both axially facing sides thereof, said first and second bevel gears meshing with opposite sides of said ring gear.

5. A machine tool as defined in claim 1 in which said first and third axes are disposed in line with one another when said second slide is turned to a predetermined position about said second axis.

6. A machine tool head comprising a support, a power-driven shaft mounted on said support to rotate about its own axis, a first housing mounted on said support to rotate relative to said support and said shaft about a first axis coinciding with the axis of said shaft, a second housing supported by said first housing to rotate with said first housing about said first axis and to rotate relative to said first housing about a second axis which is inclined relative to said first axis at a predetermined acute angle substantially less than a right angle, a spindle supported by said second housing to rotate with said second housing about said second axis and to rotate relative to said second housing about a third axis which is inclined relative to said second axis at an acute angle which is equal to said predetermined angle, said first, second and third axes all intersecting one another at a common point, means selectively operable to turn said first housing about said first axis, means selectively operable to turn said second housing about said second axis, and means coupling said shaft to said spindle and operable to maintain a rotative drive from said shaft to said spindle to turn said spindle about said third axis both when said first housing is turned about said first axis and when said second housing is turned about said second axis, said coupling means comprising a first gear secured to and coaxial with said shaft, a second gear secured to and coaxial with said spindle, and third gear means for rotatively coupling said first and second gears.

7. A machine tool head as defined in claim 6 in which said means for turning said second housing comprise bevel gears coaxial with said shaft and said second housing.

8. A machine tool head as defined in claim 7 in which said first gear, said second gear and said third gear means are bevel gears.

* * * * *